July 6, 1965 P. COUNTS 3,192,794
BRAKE, CLUTCH AND ACCELERATOR HAND CONTROL FOR PARAPLEGICS
Filed June 8, 1962 2 Sheets-Sheet 2

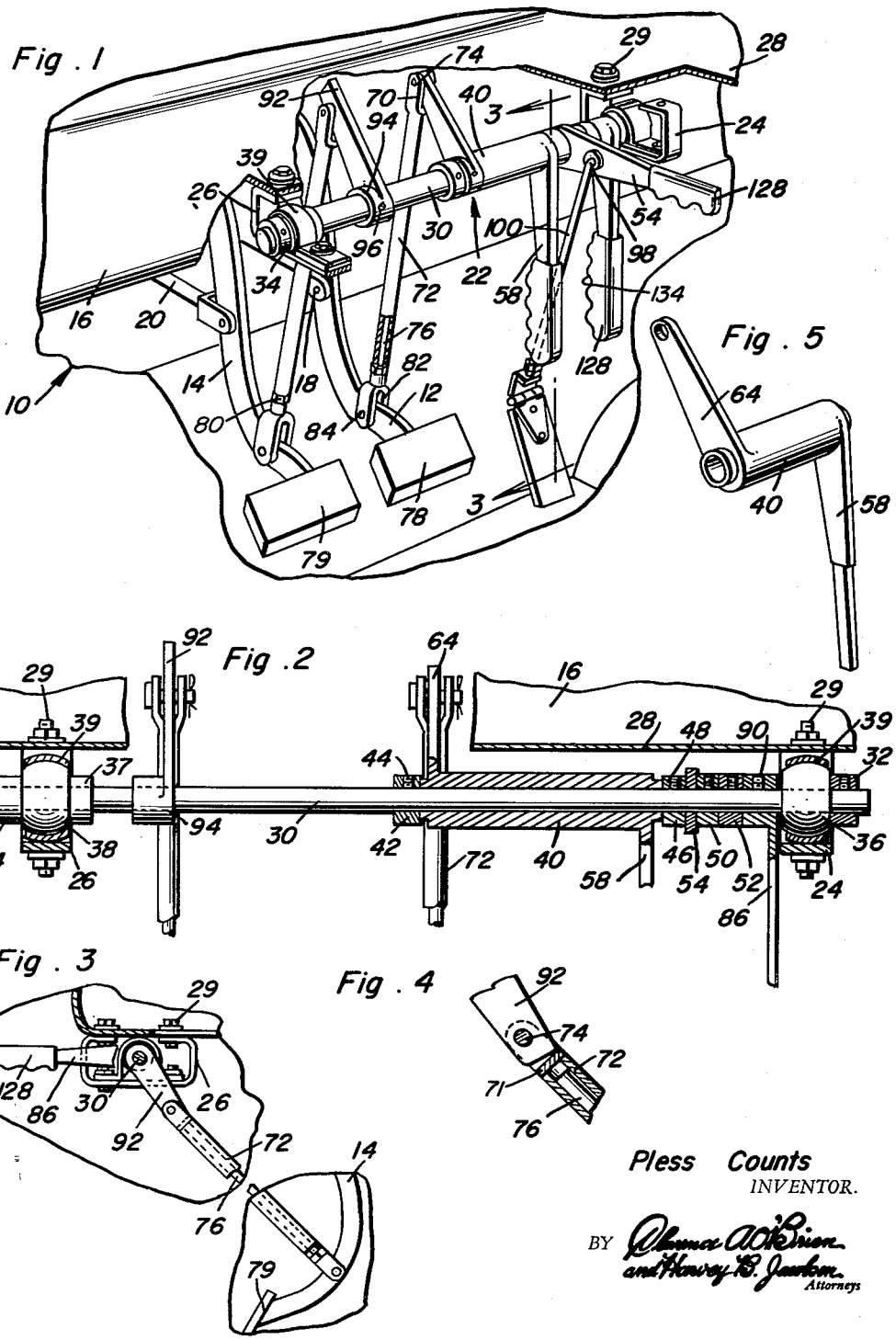

Pless Counts
INVENTOR.

United States Patent Office 3,192,794
Patented July 6, 1965

3,192,794
BRAKE, CLUTCH AND ACCELERATOR HAND
CONTROL FOR PARAPLEGICS
Pless Counts, Box 229, Salem, Mo.
Filed June 8, 1962, Ser. No. 201,036
4 Claims. (Cl. 74—481)

This invention relates to a novel and useful control assembly for actuating either the accelerator and brake pedals of a vehicle or accelerator and brake pedals plus the clutch pedal of a vehicle. The control assembly is specifically adapted to be hand operated and is therefore to be utilized for the most part as a means to enable paraplegics not having full use of their lower limbs to operate the conventional type of motor vehicle whether the motor vehicle be provided with a standard transmission or with an automatic transmission.

While the control assembly of the instant invention has been designed primarily for use by paraplegics, it is to be noted that the control assembly could also be utilized in driver training vehicles with the hand operated portions of the controls disposed on the passenger side of the vehicle for manipulation by the instructor accompanying the person learning to drive. As the control assembly of the instant invention does not require the provision of additional brake, clutch and accelerator pedals, and only hand levers which are operatively connected to the existing brake, clutch and accelerator pedals, the conversion of a conventional vehicle into a driver training vehicle by means of the control assembly of the instant invention would be less expensive than the conventional types of conversion units presently used which utilize supplemental control pedals for the brake, clutch and accelerator.

The main object of this invention is to provide a control assembly which may be conveniently supported from the undersurfaces of a vehicle dashboard and operatively connected to the control pedals of the vehicle in order that the control pedals of the vehicle may be operated by the right hand of the driver of the vehicle.

A further object of this invention, in accordance with the immediately preceding object, is to provide a control assembly which may be readily modified so as to position the hand controls for the control assembly in a forward portion of the passenger portion of the front seat compartment of a vehicle in order that the hand controls may be operated by an instructor teaching a person to drive a vehicle.

A still further object of this invention, in accordance with the immediately preceding object, is to provide a control assembly which may be operatively connected to the control pedals of a vehicle in such a manner that conventional foot operation of the vehicle control pedals may be carried out.

Another object of this invention is to provide a control assembly including hand operable pivotally mounted control hand levers for operation of the conventional clutch and brake foot pedals of a vehicle, which hand levers normally depend so that they may be swung upwardly to move the brake and clutch pedals of a vehicle from their normal rest positions. The clutch lever has an overcenter position to hold the clutch pedal down while the transmission gears are shifted.

A final object of this invention to be specifically enumerated herein is to provide a control assembly in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the control assembly of the present invention installed in a conventional type of vehicle as seen from the left side thereof with portions of the vehicle and control assembly being broken away and with the control assembly of the instant invention operatively connected to the brake, clutch and accelerator pedals of the vehicle;

FIGURE 2 is a longitudinal sectional view taken substantially upon a plane passing along the shaft;

FIGURE 3 is an enlarged transverse vertical sectional view taken substantially upon a plane indicated by section line 3—3 of FIGURE 1;

FIGURE 4 is a fragmentary detailed sectional view of the overcenter connection between the arm and operating rod for the clutch pedal;

FIGURE 5 is a perspective view of the lever, sleeve and arm unit for operating the brake pedal;

Figure 6:
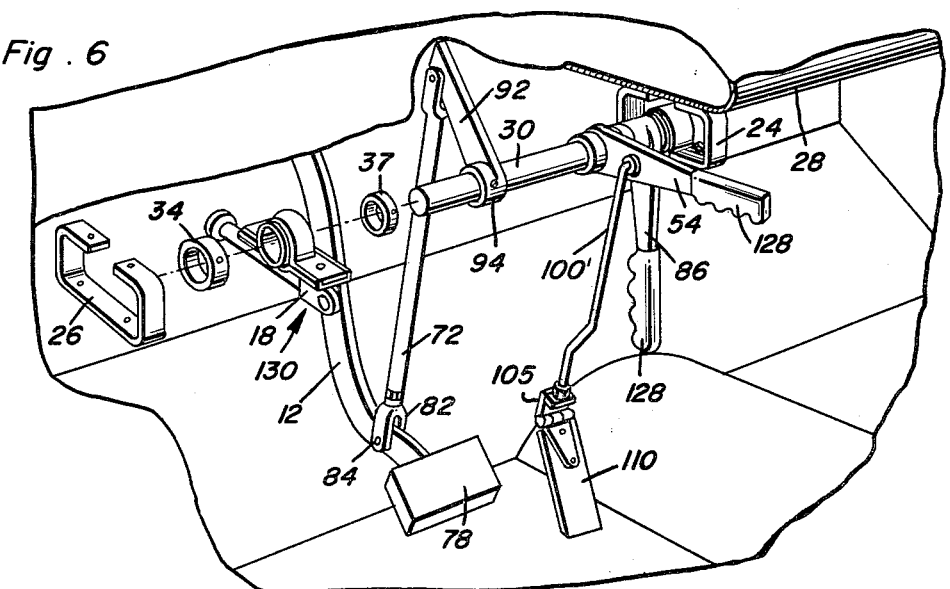
FIGURE 6 is a perspective view, with portions exploded, similar to that of FIGURE 1 but showing a modified arrangement of control assembly adapted to be used in conjunction with a vehicle having an automatic transmission in which the arm which operated the clutch in the assembly of FIGURE 1 has been moved on the shaft to operate the brake pedal in this arrangement.

Referring now more specifically to FIGURES 1 through 4 of the drawings it will be seen that the vehicle which is generally designated by the reference numeral 10 is conventional in design and is provided with suspended brake and clutch levers 12 and 14 which depend downwardly below the dashboard 16 in a conventional manner. The levers 12 and 14 are operatively connected to push rods 18 and 20 respectively for operation of the brake and clutch mechanisms (not shown) of the vehicle 10.

The control assembly of the instant invention is generally designated by the reference numeral 22 and includes a pair of depending open rectangular supports 24 and 26 which are secured to the lower horizontal flange 28 of the dashboard 16 by fastener bolts 29. A support shaft 30 is provided and has opposite end portions rotatably received in the bearings 36 and 38 supported in the supports 24 and 26. Stop collars 32 and 34 are carried by the ends of the shaft 30 for engaging the outer sides of the corresponding journal support and in this manner the shaft 30 is journaled for rotation about its longitudinal axis and retained against axial displacement. If desired, a stop collar 37 is mounted on shaft 30 in opposition to collar 34 to further limit axial shifting of the shaft 30. The open rectangular supports 24 and 26 are split at the upper end thereof for enabling some adjustment of the bolt holes by bending the side pieces inwardly. Also, the bearings 36 and 38 are of the roller or ball type and have a spherical outer surface pivotally engaging a bracket 39 attached to the bottom of the support thus enabling the supports to be slightly misaligned and still journal shaft 30.

A brake pedal operating unit including a sleeve 40 is journaled on the mid portion of the support shaft 30 and is independently rotatably supported thereon for rotation about its longitudinal axis. A first stop collar 42 is secured to the support shaft 30 in any convenient manner such as by a setscrew 44 and comprises a limit stop for axial shifting of the sleeve 40 relative to the support shaft 30 in one direction. A second stop collar 46 is secured to the support shaft 30 in any convenient manner such as by a setscrew 48 outwardly of the end of the sleeve 40 remote from the collar 42 and the collar 46 prevents axial movement of the sleeve 40 relative to the support shaft 30 in a direction away from the collar 42.

The brake pedal operating unit also includes a brake control lever 58 integral with one end of the sleeve 40 adjacent the stop collar 46. A brake actuating crank arm 64 is integral with the other end of the sleeve 40 adjacent the collar 42. The free end of the crank arm 64 is pivotally secured to the bifurcated end 70 of a tubular brake control rod 72 by means of a pivot pin 74. The brake control rod 72 includes an inner or lower portion 76 freely slidable therein. The lower portion 76 includes an externally threaded shank portion having a nut 80 threadedly engaged therewith and abutting the lower end of rod 72 for adjusting the effective length thereof. The lower end of the inner portion 76 is threaded into the bifurcated clevis 82 and is pivotally secured to the brake lever 12 inwardly of brake pedal 78 by means of pivot pin 84.

A clutch control lever 86 is mounted on the support shaft 30 adjacent the journal support 24 and is rigidly secured to the support shaft 30 for rotation therewith by means of a setscrew 90.

A clutch crank arm 92 including an attaching portion 94 is mounted on the support shaft 30 adjacent the journal support 26 and the journal portion 94 is secured to the support shaft 30 for rotation therewith by means of a setscrew 96. The free end of the crank arm 92 is inclined at 91 and is connected to a rod similar to rod 72 by it being pivotally secured to the bifurcated end 70 of the control rod 72 by means of the pivot pin 74. The end 91 engages abutment 71 in end 70 when moved to an overcenter position illustrated in FIGURES 3 and 4. The bifurcated lower end 82 of the clutch control rod 72 is pivotally secured to the clutch lever 14 adjacent pedal 79 by means of a pivot pin 84 which enables operation of the pedals 78 and 79 by using the feet in a conventional manner.

Figure 9:
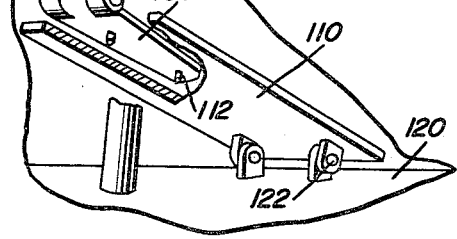
FIGURE 9 is a fragmentary perspective view, with portions broken away, illustrating the hinge connection between the accelerator pedal and the operating rod therefor.

With attention now directed to FIGURES 1 and 9 of the drawings it will be seen that an accelerator control lever 54 is journaled on shaft 30 and has a transverse bore formed therein in which a laterally directed upper end portion of the accelerator control rod 100 is pivotally received. The lever 54 engages collar 46 and one or more spacer collars 50 and 52 on shaft 30 for spacing the lever 54 from the lever 86 but enabling the lever 54 to be depressed by the thumb as the hand is used to lower the lever 86 for efficient operation. The lower end of the accelerator control rod 100 has a threaded end 102 threaded through a plate 104 attached to a hinge plate 105 and locked in place by a lock nut 106. The other hinge plate 107 is connected to the hinge plate 105 by a hinge pin 108 and attached to the accelerator pedal 110 by fasteners 112. In this manner the lower end of the accelerator control rod 100 is hingedly secured to the free end of the accelerator pedal 110 which is conventional and is pivotally secured to the floorboard 120 by means of pivot pins 122.

With attention now directed to FIGURES 1 and 6 of the drawings it will be seen that each of the control levers has a reduced end portion at its free end which is generally rectangular in cross-section. Hand grips 128 of plastic or similar material are mounted on each lever and contoured to provide indentations 134 for the reception of the fingers of a hand engaged therewith.

Figure 7:
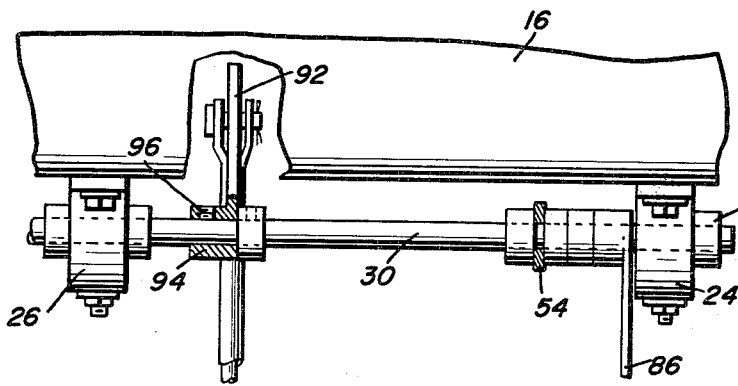
FIGURE 7 is a longitudinal elevational view with portions in section illustrating the arrangement of the components.
Figure 8:
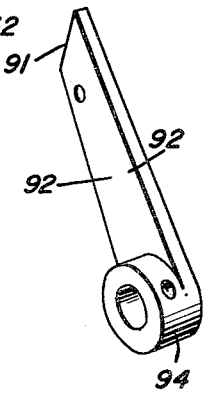
FIGURE 8 is a perspective view of the brake pedal operating arm which was the clutch operating arm in the arrangement of FIGURE 1.

With attention now directed to FIGURES 6 through 8 of the drawings, there will be seen a simplified arrangement of control assembly used in an automobile having an automatic transmission and generally referred to by the reference numeral 130 which is similar in many respects to the control assembly 22 and identical reference numerals are employed for identical parts.

It may be observed from a comparison of FIGURES 6 and 7 with FIGURES 1 and 2 respectively that the brake pedal operating unit including the arm 64, sleeve 40 and lever 58 have been removed and that the clutch arm 92 has been repositioned on the support shaft 30 so as to function as a brake arm. Accordingly, the depending journal supports 24 and 26 directly journal the support shaft 30 and the lever 86 is used to apply the brakes of an automobile having an automatic transmission. In this arrangement, the rod 100' is provided with an offset to adapt the device to various orientations of accelerator pedals in different vehicles.

In operation, it is first necessary to pull rearwardly and upwardly on the control lever 86 in order that the clutch lever 14 may be depressed. As the clutch lever 14 is fully depressed the clutch arm 92 and its associated control rod 72 are releasably retained in an overcenter position as illustrated in FIGURE 4 by means of the usual spring pressure on the clutch mechanism and the engagement of the abutment 71 carried by the clutch control rod 72 with the inclined end 91 of the clutch arm 92. Then, the transmission (not shown) of the vehicle 10 is placed in gear and the free end of the control lever 86 is lowered and the accelerator pedal control lever 54 is moved slightly downwardly at its free end in substantially the same manner as the normal procedure when using the feet on the clutch pedal and accelerator pedal. This will engage the clutch of the vehicle and increase the operating speed of the engine thereof. Subsequent changes of the gears of the transmission are carried out in a similar manner. When it is desired to apply the brakes of the vehicle 10, the brake control lever 58 is pulled rearwardly and upwardly. If it is desired to stop or slow down the vehicle with the clutch disengaged, all that is necessary is to pull the handle 86 rearwardly and upwardly the full distance until the overcenter position of the clutch arm 92 is reached enabling the normal spring force acting on the clutch lever 14 to retain the handle 86 in the overcenter position with the clutch lever 14 depressed. Then, the control lever 58 may be pulled rearwardly and upwardly to apply the brakes.

Between each change of gears the clutch handle 86 is allowed to hold the clutch pedal 14 down by its overcenter position. This allows the driver of the vehicle 10 to use his left hand at all times to steer the vehicle as only his right hand is used to actuate the clutch, gear shift and brake mechanisms. It is of course to be understood that the free end of the accelerator pedal control lever 54 is normally resiliently urged toward an uppermost position by means of the usual spring pressure acting on the accelerator pedal 110. When the arm 92 is used as a brake arm, the limited movement of the brake pedal 78 prevents arm 92 from approaching its overcenter position. Also, the adjustment of the length of the rod 72 enables the assembly to be installed in various vehicles without modifying the existing pedals to an extent that prevents them from being employed in the usual manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A control device for the brake pedal means and accelerator pedal of a vehicle having a dashboard disposed above said pedal and pedal means, said device comprising an elongated shaft, means journaling said shaft from the dashboard, an accelerator hand operated control lever journaled on said shaft substantially in alignment with the accelerator pedal, means connecting the lever and accelerator pedal for depressing the accelerator pedal when the lever is depressed, a brake arm rigidly attached to said shaft and substantially aligned with the brake pedal means, means operatively connecting the brake arm and the brake pedal means, a brake hand operated control lever rigid with said shaft adjacent the accelerator lever whereby the hand operated levers may be manipulated in maneuvering the vehicle, said shaft journaling means including a pair of brackets, bearing means mounted on said shaft, and mounting means adjustably supporting the bearing means from the brackets for enabling the shaft to be journaled from the brackets when the brackets are misaligned.

2. A control device for the clutch pedal means and accelerator pedal of a vehicle having a dashboard comprising an elongated shaft, means journaling said shaft from the dashboard, an accelerator hand operated control lever journaled on the shaft substantially in alignment with the accelerator pedal, rod means connecting said lever and accelerator pedal, a clutch arm rigidly attached to said shaft, rod means pivotally connected to the clutch arm and clutch pedal means, a hand operated clutch lever rigidly attached to said shaft adjacent to the accelerator lever whereby one hand can operate the clutch lever and the accelerator lever, said clutch arm being provided with an inclined end, said rod including an abutment engaged by the inclined end of the clutch arm when the clutch arm and rod move past an aligned condition for maintaining the clutch pedal means in depressed position.

3. The structure as defined in claim 2, together with brake pedal means in the vehicle, a sleeve journaled on said shaft, a brake arm on said sleeve in substantial alignment with said brake pedal means, rod means connecting the brake arm and brake pedal means, a brake hand operated lever on said sleeve for actuating the brake pedal means, said levers being disposed adjacent to each other.

4. The combination of claim 3, wherein each of said rod means is adjustable and provided with lost motion telescopic sections which enables the clutch and brake pedal means to be depressed while the control levers remain stationary.

References Cited by the Examiner
UNITED STATES PATENTS

| | | | |
|---|---|---|---|
| 2,411,500 | 11/46 | Bradley | 74—481 |
| 2,489,727 | 11/49 | Shipley | 74—482 |
| 2,618,168 | 11/52 | Onsrud | 74—481 |
| 2,783,659 | 3/57 | Kelsey | 74—481 |
| 2,855,797 | 10/58 | Dunn | 192—3 |

DAVID J. WILLIAMOWSKY, *Primary Examiner.*
ROBERT C. RIORDON, *Examiner.*